US006381007B2

(12) United States Patent
Fabre et al.

(10) Patent No.: US 6,381,007 B2
(45) Date of Patent: Apr. 30, 2002

(54) PHOTOSENSITIVE CHARGE-ACCUMULATING DEVICE AND A LIDAR INCORPORATING SUCH A DEVICE

(75) Inventors: Frédéric Fabre, Toulouse; Didier Morancais, Beaupuis; Michel Tulet, Balma, all of (FR)

(73) Assignee: Astrium SAS, Velizy Villacoublay (FR)

( * ) Notice: Subject to any disclaimer, the term of this patent is extended or adjusted under 35 U.S.C. 154(b) by 0 days.

(21) Appl. No.: 09/741,144

(22) Filed: Dec. 21, 2000

(30) Foreign Application Priority Data

Dec. 24, 1999 (FR) ........................................... 99 16482

(51) Int. Cl.[7] ............................ G01P 3/36; G01C 3/08; H04N 5/335

(52) U.S. Cl. ...................... 356/28.5; 356/5.09; 348/298

(58) Field of Search .............................. 356/5.01–5.09, 356/141.1, 28.5; 348/297, 298

(56) References Cited

U.S. PATENT DOCUMENTS 4,881,809 A * 11/1989 Thierry
5,056,914 A * 10/1991 Kollodge
5,166,800 A * 11/1992 Mori et al.
6,084,659 A * 7/2000 Tulet et al. ................ 356/5.01

FOREIGN PATENT DOCUMENTS

EP 0907284 4/1999

* cited by examiner

*Primary Examiner*—Stephen C. Buczinski
(74) *Attorney, Agent, or Firm*—Larson & Taylor, PLC

(57) ABSTRACT

The photosensitive device implements charge coupling and accumulation for analyzing a light signal. A sensor has an image zone M rows and N columns of photosensitive sites for receiving a light signal during successive acquisition periods, a transfer zone of P rows and N columns of non-photosensitive sites for receiving, in each site of a first row, the sum of the charges in a respective column of the image zone at the end of each successive sampling period. It also has a storage zone of P rows an N columns in which each column is adjacent to a respective column of the transfer zone and each site is arranged to receive charges contained in an adjacent site of the transfer zone and to accumulate it. The sensor is clocked for a sequence. During each of R successive observation periods, there are P successive time samplings each of duration T, each by simultaneously transferring charges into the sites of the storage zone and subsequently transferring the charges from all sites into a single column into the first row of the transfer zone after moving charges of each row from the transfer zone to the following row. After P samples have been taken, the charges of each row of the transfer zone are transferred to the adjacent site of the storage zone. After R observation periods, the storage zone is read out row by row.

5 Claims, 2 Drawing Sheets

40
CLOCK
LASER
10
42
GENER.
READ OUT & PROCESSING
18
14
12
16

LASER SHOT
PR
READ OUT
TIME
OBS.1
OBS.2
OBS.R
CHARGE GENER.
BLOCK MVMT IN THE TRANSFER
PMH
STORAGE ZONE ACCUMULATION
T
PI
PMT
SAMPLING 1
SAMPLING P

N COLUMNS
21
21
14
M ROWS
$f_0$
20
24
P ROWS
28
28
26

PHOTOSENSITIVE CHARGE-ACCUMULATING DEVICE AND A LIDAR INCORPORATING SUCH A DEVICE

BACKGROUND OF THE INVENTION

The present invention relates to a photosensitive device implementing electric charge coupling and accumulation, and enabling light signals to be analyzed. A major although non-exclusive application lies in so-called "lidar" apparatuses for measuring the range to obstacles or to media that reflect or back-scatter short pulses of light. Such lidars are used in particular to determine the altitude and the position of clouds by measuring the travel time of laser pulses back-scattered by the surfaces of clouds. A particular type of lidar known as a "wind" lidar serves to measure average wind speed in various altitude ranges by using the wavelength shift that is caused by the Doppler effect.

Proposals have already been made (document FR-A-2,735,935) for a photosensitive device implementing charge coupling and storage for analyzing light signals and incorporating a photodetector matrix. The detector is constituted by a charge-coupled device (CCD) and presents numerous advantages, particularly when high sensitivity is required. CCD detectors can be made so as to have high quantum efficiency from the ultraviolet to the near infrared; they make it possible on a single chip to combine functions of integrating charge and of performing analog storage. They enable charge to be transferred at high frequency. Their read noise is low.

For a wind lidar, the device is associated with a spectrometer enabling each column of the image zone to be associated with a different spectrum shift, and thus with a different speed.

Improvements to the above device are described in French application FR-A-2,769,450 corresponding to EP 0 907 284 and U.S. Pat. No. 6,084,659 to which reference can be made; they enable electrical charges to be accumulated in charge coupling means, thereby enabling the device to be read at intervals corresponding to a plurality of successive observation periods, i.e. only after several successive laser shots when the device is incorporated in a lidar.

French patent FR-A-2,769,450 discloses a photosensitive device implementing charge coupling and accumulation for analyzing a light signal and comprising:

- an image zone constituted by a matrix of M rows by N columns of photosensitive sites for receiving the light signal during successive acquisition periods;
- a first memory zone constituted by a matrix of P rows and N columns of non-photosensitive sites for receiving in each site of a first row constituting an integration row, the total charge in a respective column of the image zone, at the end of each successive acquisition period;
- a read register having a single row of N sites for receiving in parallel the charge stored in the last row of the first memory zone;
- a second memory zone of P rows and N columns for receiving in parallel the charge admitted to the N sites of the read register and for applying it to N sites of a single line in the image zone or of the first memory zone, thereby accumulating in each row of the first memory zone the charge as accumulated over an observation period and coming from a plurality of successive summing operations; and
- clocking means operating:
  - at the end of each acquisition period and in a time that is short relative to the acquisition period, to transfer the charge stored in all of the sites in each column of the image zone along the column to a respective site of an integration line in which charge is summed;
  - during each observation period, to transfer the charge accumulated in each site of the integration line stepwise at the acquisition rate, along the columns of the memory zone towards the read register; and
  - to read the read register after a plurality of observation periods.

This makes it possible, in particular, to loop back to the image zone or the first memory zone, so that each row of the first memory zone accumulates charge coming from a plurality of successive summing operations.

In a first embodiment, illustrated in FIG. 2, the read register has at least N additional sites to which charge coming from the last row of the first memory zone is transferred in order to be reintroduced into the second memory zone, and the second memory zone is designed to enable the accumulated charge it contains to be transferred serially to an integration zone. At the end of each acquisition period, the contents of the lines corresponding to the second memory zone and the image zone are accumulated in said integration zone. The integration line is constituted by a shift register having at least 2N sites. Among the N sites, there are N sites receiving in parallel the content of the last line of the second memory zone, and N sites capable of summing the charge they contain with charge transferred from the memory zone.

That solution has the advantage of avoiding high levels of charge on a given row disturbing lower levels of charge present in other rows. However, implementing it gives rise to difficulties in implanting sequencing clock electrodes for the N sites which receive the charge transferred from the image zone.

In a second case disclosed in FIG. 3 of FR-A-2,769,450, the second memory zone is designed so that the charge contained in each row of said second memory zone and coming from corresponding rows of the first memory zone can be transferred into the corresponding rows of the image zone prior to each observation period.

That requires only the provision of clocking having additional outputs for controlling transfers to and from the auxiliary second memory.

Implementation remains simple. However charge is transferred back and forth through the image zone. Imperfections in transfer between rows mean that in some applications time samples of low flux are polluted by the row that is the most illuminated, and consequently that charge becomes "smeared".

SUMMARY OF THE INVENTION

The invention seeks in particular to provide a device that avoids the above limitations to a large extent.

To this end, the invention provides a device comprising:

- an image zone constituted by a matrix of M rows and N columns of photosensitive sites for receiving a light signal during successive acquisition periods;
- a transfer zone constituted by a matrix of P rows and N columns of non-photosensitive sites for receiving in each site of a first row constituting an integration row the total charge in a respective column of the image zone at the end of each successive sampling period;
- a storage zone of P rows and N columns in which each column is adjacent to a respective column of the transfer zone and each site is designed to receive the charge contained in an adjacent site of the transfer zone and to accumulate it with the charge it contains already; and clocking means operating:

(a) during each of R successive observation periods, to obtain P successive time samples of duration T, each by simultaneously transferring charge into the sites of the memory zones and, in a period that is short relative to the duration T, subsequently transferring the charge from all of the sites in a single column into the first row of the transfer zone after moving charge from each row of the transfer zone to the following row; and after said P samples have been taken, to transfer the charge of each row of the transfer zone to the adjacent site of the storage zone; and (b) after R observation periods, to cause the storage zone to be read row by row.

It should also be observed that the device finds an additional application in constituting a fast low-flux radiometer using the image and memory zones of the device as a receiver of low light levels.

The above characteristics and others will appear more clearly on reading the following description of a particular embodiment given by way of a non-limiting example. The description refers to the accompanying drawings.

DETAILED DESCRIPTION

Figure 1:
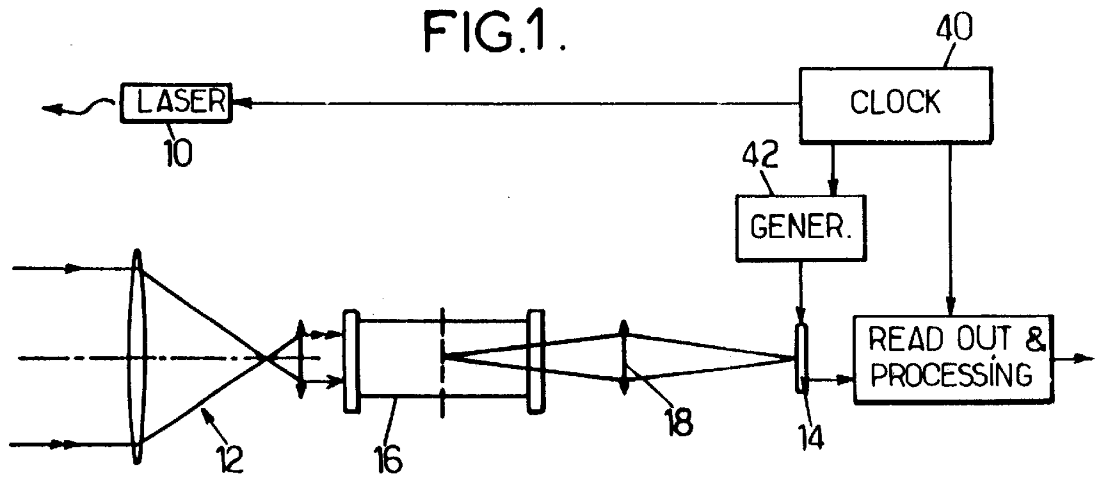
FIG. 1 is a block diagram of a wind lidar constituting an embodiment of the invention.

The lidar is shown diagrammatically in FIG. 1. It comprises a source 10 of short light pulses (typically 20 ns to 30 ns), generally constituted by a garnet laser. The back-scattered light flux which presents a wavelength shift $\delta\lambda$ proportional to the speed of the obstacle or the medium giving rise to back-scattering is picked up by a telescope 12 which supplies a parallel beam to an interference filter 16 which can be constituted, in particular, by a Fizeau interferometer. The function of the interferometer is to generate a linear fringe whose position is offset relative to a midplane as a function of the spectrum shift $\delta\lambda$. An output optical system 18 forms an image of the fringe(s) output from the interferometer on the image zone of a CCD detector 14.

A clock 40 controls the laser 10 and a clock signal generator 42 for generating the clock signals required for transferring charge in the CCD detector.

In general, the device has a shift register with N or 2N parallel input positions and a serial output to a read amplifier which is placed so as to receive the contents of all P rows of the storage zone in succession.

Figure 2:
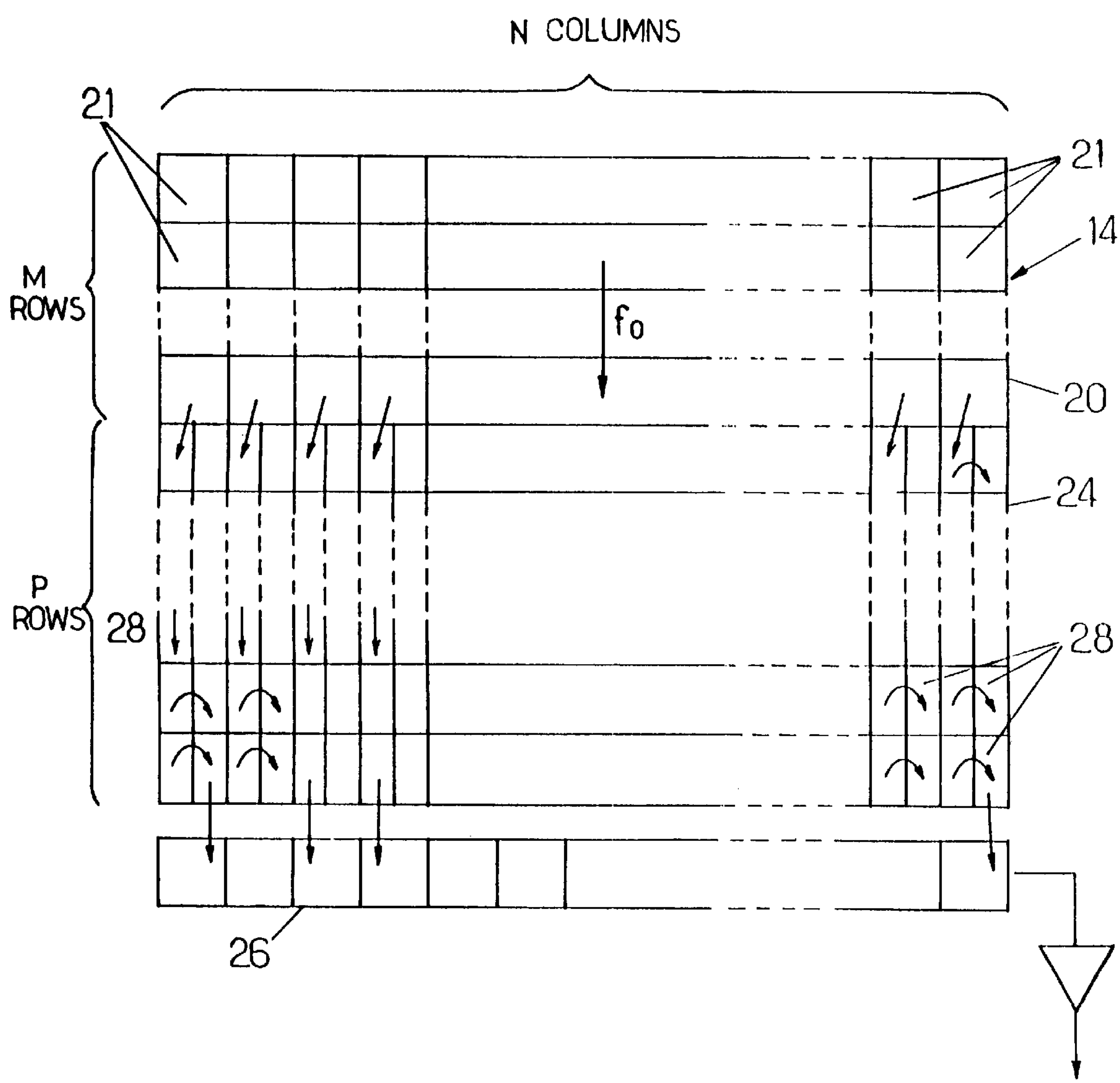
FIG. 2 is a diagrammatic plan view of a photosensitive device constituting an embodiment of the invention.

The photosensitive device 14 whose structure is shown in FIG. 2 has an image zone 20 comprising a matrix of M rows and N columns of photosensitive sites 21. The image zone is followed in the direction $f_0$ of parallel charge transfer by a memory 24 constituted by a matrix of P rows of non-photosensitive sites (e.g. masked by a deposit of aluminum or by a mechanical mask) and then by a read register 26 having parallel inputs and a serial output in the direction indicated by arrow $f_1$.

The memory can be regarded as being constituted by a transfer zone and a storage zone.

The transfer zone is constituted by a matrix of P rows and N columns of non-photosensitive sites. The first row of this transfer zone constitutes a zone in which charge coming from the image zone is integrated.

The storage zone is constituted by NxP sites or pixels 28 occupying P rows and N columns. Each column is adjacent to a respective column of the transfer zone. Each site of the storage zone is designed to receive the charge contained in the adjacent site of the transfer zone and to accumulate it with the charge it already contains.

The read register 26 shown has N sites (or 2N sites) disposed so as to receive in parallel the charge transferred from the last row of the storage zone.

The image zone 20, the memory 24, and the register 26 are implanted on a semiconductor substrate carrying the electrodes required for implementing the transfers represented by arrows in FIG. 2. These electrodes belong to the CCD matrix and they are connected to clocking means comprising the clock 40 and the generator 42.

The following characteristics can be considered as representative for a wind lidar having a laser operating with 20 ns pulses and an acquisition period of 8 $\mu$s:

a monolithic detector on silicon, with masking by means of a deposit of aluminum or a separate mask, and square sites with a side of 20 $\mu$m;

M=N=16 pixels;

P=25 pixels;

registers having 2N+1=33 sites; and output stage 30 with gain of 10 $\mu V/e^-$.

The position of the interference fringe is offset from the axis by a distance $\delta x$ proportional to $\delta\lambda$, with energy distribution that can cause it to cover a plurality of columns. It can be located with accuracy better than one pixel (site width) by computing a center of gravity.

A measurement made using a device of the kind described above accumulates over time the results of a plurality of successive observations, typically 10 to 2000 observations for a wind lidar. The successive steps are then as follows:

1) Each of the R successive observations (where each observation follows a laser shot in a lidar application), comprises in succession accumulation and then transfer.

(a1) During a first sampling time, charge is generated by the light received by the image zone 20 in the sites of said zone, reception being for a duration T which is selected in a lidar as a function of the desired distance resolution.

(b1) At the end of the duration T, the charge is shifted along each column so that the charge from all of the sites in a given column accumulates in the site constituting the first row of the transfer zone belonging to that column, and this is done in a duration which is short compared with T.

(c) During each successive sampling time (corresponding to analyzing a region that is further away in a lidar application), the following occur:

charge in the image zone is accumulated again, as in step (a1);

a row of charge contained in the transfer zone is shifted row by row downwards; and as in step (b1), charge is displaced so as to accumulate in the first row of the transfer zone that has just been emptied by shifting.

P time samples are thus taken, at the end of which the sites of the P rows of the transfer zone contain charge corresponding to T successive periods.

(d) The content of each site of the transfer zone is transferred towards the site 28 of the storage zone that is adjacent thereto, as represented by curved arrows in FIG. 2.

2) Each of the following R-1 observations follows a new laser shot in a lidar application. The time delays between firing and the charge accumulation periods of duration T are the same as during the first observation. However during step (d) the transferred charge adds to the charge already present in each of the sites 28 of the storage zone.

3) Finally, reading is performed row by row via an outlet stage, and in the example shown using a shift register 26 having parallel inputs and a serial output to the read amplifier.

The architecture described above has advantages including the fact that losses during transfers between sites have little influence. An electron generated in the image zone is subjected to no more than M+P+N+1 (or M+P+2N+1) transfers, regardless of the number R of observations. Furthermore, the overall architecture of the component is simple, both in terms of number of different zones and in terms of implanting charge-shifting electrodes.

Figure 3:
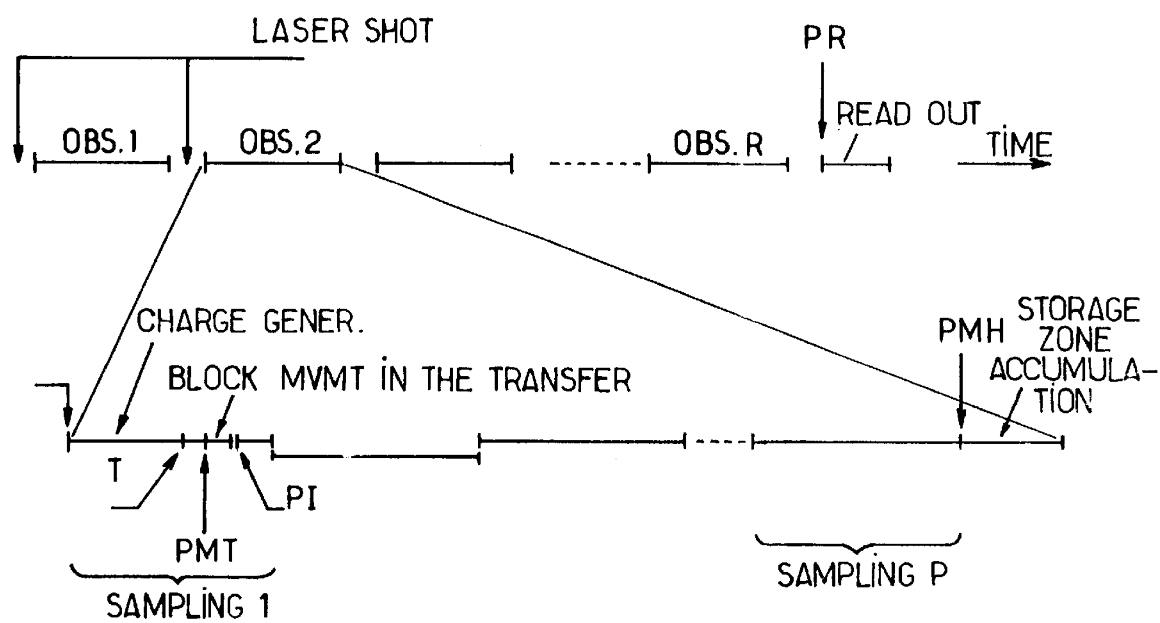
FIG. 3 is a diagram summarizing successive steps in operation.

Operation can be summarized as shown in FIG. 3. The commands applied to the electrodes are then as follows:

PMT=block transfer, row by row in the transfer zone;

P1=image zone charge accumulation in the first row of the transfer zone;

PMS=column by column transfer from the transfer zone to the image zone, together with integration; and PR=transfer to the read register.

An additional advantage of the device described above is that the entire CCD portion can also be used as a detector for fast photometric applications at low light levels. Thus, the same CCD part can equally well be used with clocking means as defined above or with a Rayleigh receiver of the kind described in French patent application FR 89/08462 in the name of CNRS to which reference may be made.

What is claimed is:

1. A photosensitive CCD device for analyzing light signals during a plurality R of successive observation periods each comprising a plurality of successive time sampling periods, R being an integer greater than 1, said device comprising:

an image zone constituted by a matrix of M rows and N columns of photosensitive sites for receiving a light signal and generating electrical charges, M and N being integers greater than 1, a memory comprising:

a transfer zone constituted by a matrix of P rows and N columns of non-photosensitive sites, P being an integer greater than 1, wherein a first one of said P rows constitutes a light integration row having N said non-photosensitive sites each arranged for receiving a sum of all charges generated in all photosensitive sites of a respective column of the image zone at the end of each one of the plurality of successive time sampling periods;

a storage zone of P rows and N columns of non-photosensitive sites, each of said N columns in said storage zone being adjacent to a respective one of said P columns of the transfer zone and each said site in said storage zone being arranged to receive charges contained in an adjacent site of the adjacent column in the transfer zone and to accumulate the received charges in addition to the charges already contained in said site in said storage zone; and clocking means for:

(a) during each of P successive time sampling periods of each one of said R observation periods, P being an integer greater than 1, successively:

causing generation of charges in all sites of said image zone responsive to one of said light signals for a predetermined duration T, simultaneously transferring charges from each site in each row of the transfer zone into the next row in said transfer zone, in a time that is short relative to the duration T, subsequently transferring the generated charges from all of the photosensitive sites in each one of said columns into a respective one of the sites in the first row of the transfer zone;

(b) following each of said time sampling periods, causing transfer of the charges of each site in each column of the transfer zone to the adjacent site in the adjacent column of the storage zone so as to add the transferred charges to the charges already present in said adjacent site in the adjacent column, and (c) after said R observation periods, causing the sites in said storage zone to be read out.

2. Device according to claim 1, further comprising:

a shift register with N parallel inputs each operatively associated with a respective one of said rows and a serial output, and a read out amplifier connected to said serial output and placed so as to receive contents of all P rows of the storage zone in succession, whereby said storage zone can be read out row by row.

3. A device according to claim 1 wherein the image zone and memory zone of the device are used as detector of low levels of light in a fast low level radiometer.

4. A lidar comprising:

a source of short light pulses, and a photosensitive CCD device located to receive reflected or back scattered light following each of said light pulses and arranged for analyzing said reflected or back scattered light during a plurality R of successive observation periods each following one of said short light pulses, each of said observation periods comprising a plurality P of successive time sampling periods, R and P being integers greater than 1, said CCD device having:

an image zone constituted by a matrix of M rows and N columns of photosensitive sites for receiving the light signal and generating electrical charges, M and N being integers greater than 1, a memory comprising:

a transfer zone constituted by a matrix of P rows and N columns of non-photosensitive sites, wherein a first one of said P rows constitutes a light integration row having N said non-photosensitive sites each arranged for receiving a sum of all charges generated in all photosensitive sites of a respective column of the image zone at the end of each one of the plurality of successive time sampling periods;

a storage zone of P rows and N columns of non-photosensitive sites, each of said N columns in said storage zone being adjacent to a respective one of said P columns of the transfer zone and each said site in said storage zone being arranged to receive charges contained in an adjacent site of the adjacent column in the transfer zone and to accumulate the received charges in addition to the charges already contained in said site in said storage zone; and clocking means for:

(a) during each of P successive time sampling periods of each one of said R observation periods, P being an integer greater than 1, successively:

causing generation of charges in all sites of said image zone responsive to one of said light signals for a predetermined duration T, simultaneously transferring charges from each site in each row of the transfer zone into the next row in said transfer zone, in a time that is short relative to the duration T, subsequently transferring the generated charges from all of the photosensitive sites in each one of said columns into a respective one of the sites in the first row of the transfer zone;

(b) following each of said time sampling periods, causing transfer of the charges of each site in each column of the transfer zone to the adjacent site in the adjacent column of the storage zone so as to add the transferred charges to the charges already present in said adjacent site in the adjacent column, and (c) after said R observation periods, causing the sites in said storage zone to be read out, wherein the clocking means are arranged for causing accumulation of charges during successive ones of said time sampling period which correspond to different durations of a back and forth light travel and for causing successive ones of said observation periods at a rate of transmission of said light pulses.

5. A wind lidar according to claim 4, wherein said lidar comprises a wind lidar further comprising an interferometer arranged to direct spectral components of different wave length to different ones of said columns of the image zone.

* * * * *